United States Patent

[11] 3,591,925

| [72] | Inventor | Frank Dupin<br>3170 Grandview Ave., Waukegan, Ill. 60085 |
|---|---|---|
| [21] | Appl. No. | 847,594 |
| [22] | Filed | Aug. 5, 1969 |
| [45] | Patented | July 13, 1971 |

[54] LINE ANGLE DEGREE LEVEL INSTRUMENT
10 Claims, 14 Drawing Figs.

[52] U.S. Cl. ................................................. 33/207 A
[51] Int. Cl. ..................................................... G01c 9/00
[50] Field of Search ............................................. 33/207, 210, 215.1, 218, 207.2, 211

[56] References Cited
FOREIGN PATENTS

| 417,804 | 1/1947 | Italy | 33/215.1 |
| 861,917 | 11/1939 | France | 33/215.1 |

Primary Examiner—Leonard Forman
Assistant Examiner—Charles E. Phillips
Attorney—Harbaugh and Thomas ABSTRACT: A line angle degree level instrument comprising a protractor body section having a protractor scale with a pendulum-type indicator arm and a rigid support rod extending the length of the body section with eyelet means at each end for attaching a flexible line and a detachable frame member for pivotally supporting the protractor body section adjacent the opposite ends of the supporting rod.

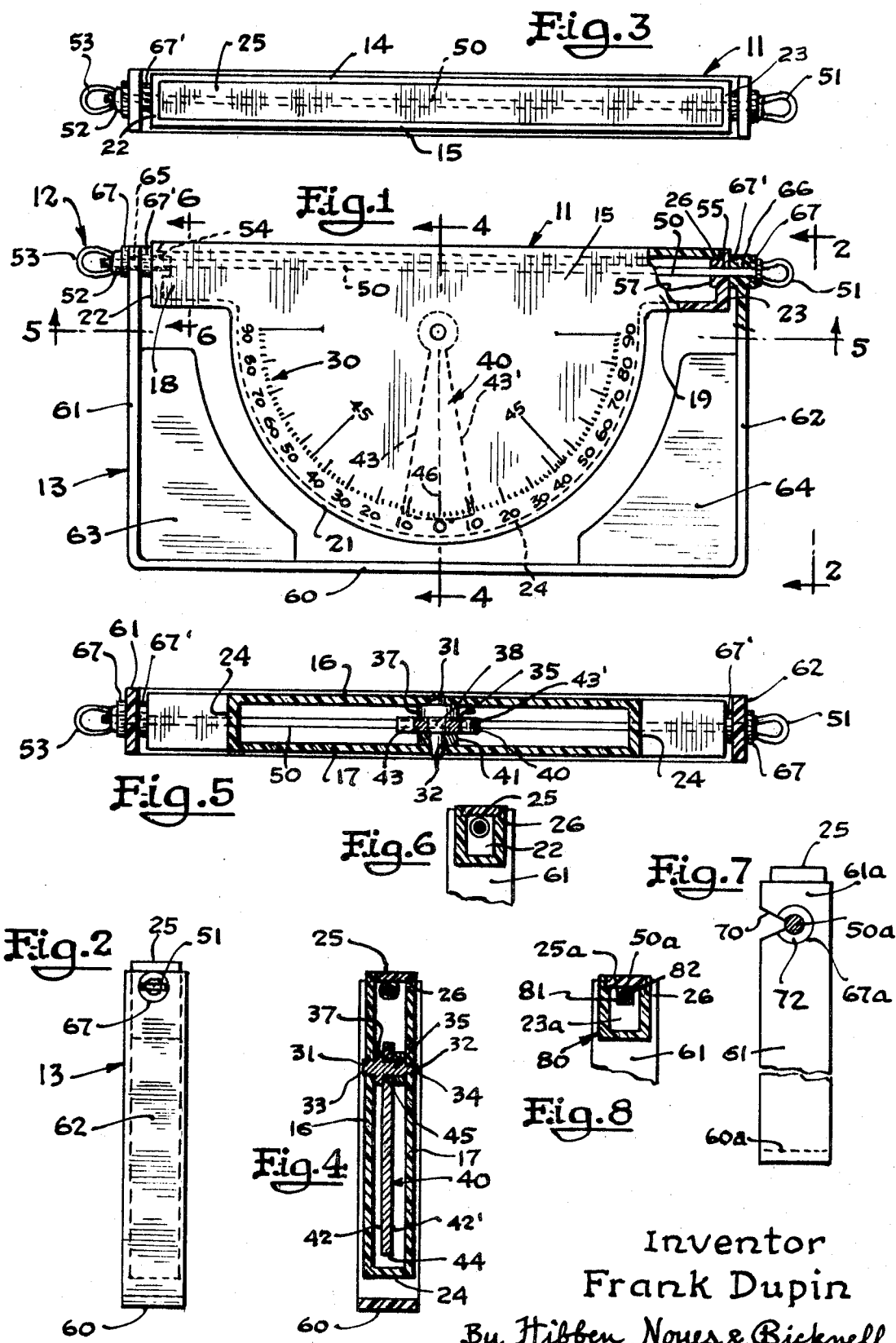

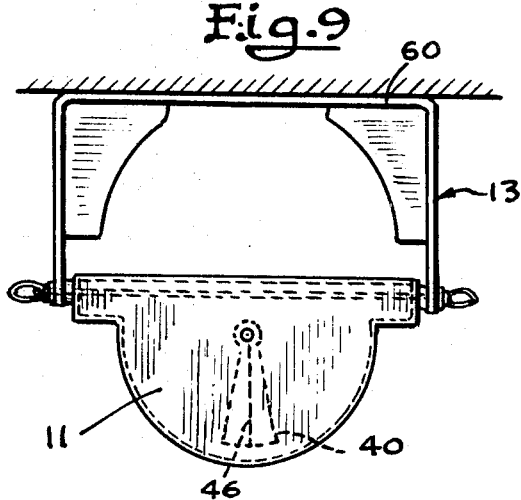
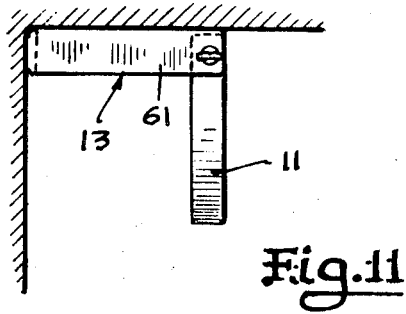
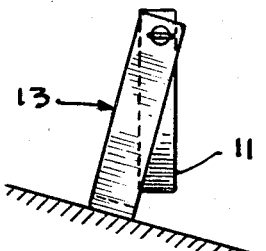
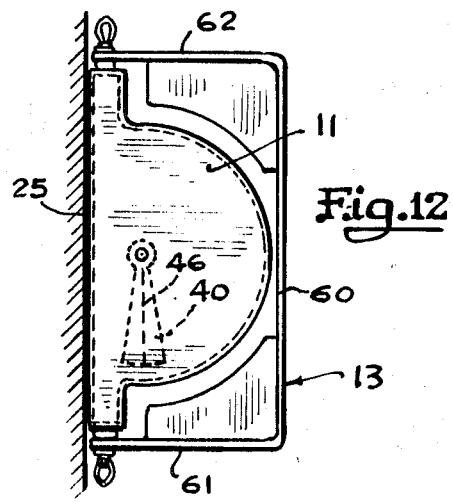
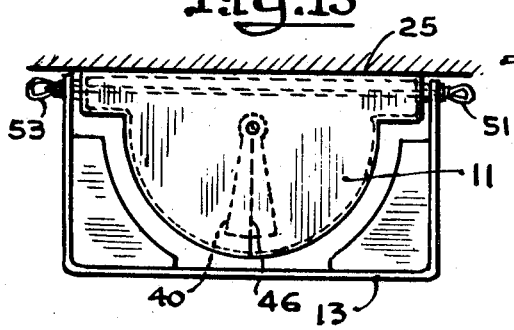
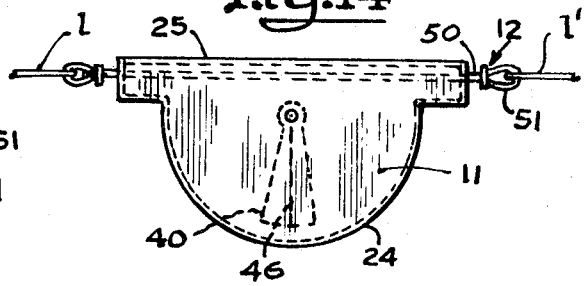
Inventor
Frank Dupin
By Hibben, Noyes & Bicknell
Attorneys 3,591,925

LINE ANGLE DEGREE LEVEL INSTRUMENT

The present invention relates generally to a level indicator instrument and more particularly to a line angle degree level indicator instrument of the pendulum type.

Many pendulum-type level indicator instruments have heretofore been devised for indicating whether a surface or line is horizontal or vertical and the degree to which the line or surface is other than horizontal or vertical. The prior art devices, however, have failed to combine in a single inexpensive pendulum-type indicator instrument means for conveniently and accurately indicating whether any surface or line is horizontal or the degree to which the surface or line is other than horizontal. Accurate degree level readings are particularly difficult to obtain with the prior art pendulum-type instruments when the surface does not lie in a plane having any portion thereof parallel with a horizontal plane, because the pendulum fails to assume a truly perpendicular position when the instrument is not in a substantially vertical position. Also, inaccurate readings with prior art instruments are caused by the failure of the pendulum to assume a truly perpendicular position when suspended by a line, because of the forces applied to the instrument.

It is therefore an object of the present invention to provide an improved inexpensive pendulum-type angle degree level indicator instrument which gives accurate readings under a wide range of operating conditions, including readings for a plane surface which has no portion thereof lying in a horizontal plane.

Other objects of the present invention will be apparent to those skilled in the art from the following detailed descriptions and claims when read in conjunction with the accompanying drawing wherein:

FIG. 1 is an elevational view partially in vertical section of a line angle degree level instrument embodying the present invention;

FIG. 2 is an end elevational view taken along the line 2, 2 of FIG. 1;

FIG. 3 is a top plan view of the instrument of FIG. 1;

FIG. 4 is a vertical sectional view taken along the line 4, 4 of FIG. 1;

FIG. 5 is a horizontal sectional view taken along the line 5, 5 of FIG. 1;

FIG. 6 is a fragmentary vertical sectional view taken along the line 6, 6 of FIG. 1;

FIG. 7 is a fragmentary end elevational view of a modified form of the present invention taken in section through the support section;

FIG. 8 is a fragmentary vertical sectional view of a further modified form of the present invention;

FIG. 9 is a schematic elevational view of one mode of using the instrument of FIG. 1;

FIG. 10 is a schematic end elevational view of a further mode of using the instrument of FIG. 1;

FIG. 11 is a schematic end elevational view of a still further mode of using the instrument of FIG. 1;

FIG. 12 is a schematic side elevational view of another mode of using the instrument of FIG. 1;

FIG. 13 is a schematic side elevational view of still another mode of using the instrument of FIG. 1; and FIG. 14 is a schematic side elevational view of a mode of using only a part of the instrument of FIG. 1 as a line angle degree level indicator.

In FIG. 1 of the drawing a preferred embodiment of the present invention is shown which comprises a protractor body section 11 having a longitudinally extending rigid pivotal support means 12 mounted thereon and a supporting frame member 13 which engages the opposite end portions of the pivotal support means 12 to form a unitary assembly. The protractor body section 11 is comprised of planar-spaced parallel lateral walls 14 and 15, with each having a lower depending semicircular portion 16, 17 and a laterally extending arm portion 18, 19. The spaced lateral walls 14, 15 have the opposite ends and lower edges thereof connected by a continuous wall section 21 which forms opposite end walls 22, 23 at their upper extremities and a lower wall 24 of the body section 11 therebetween. The upper portions of the spaced lateral walls 14, 15 and the end wall sections 22, 23 are connected by a planar transversely disposed upper wall 25 which fits within the opening formed by the spaced lateral walls 14, 15 and the end walls 22, 23. The upper wall 25 is preferably recessed slightly below the upper edges of the walls 14, 15 and 22, 23. A supporting shoulder for the upper wall 25 is provided on the inner surfaces of the lateral walls 14, 15 and end walls 22, 23, as best shown at 26. The lateral walls 14, 15 and the end walls 22, 23 all have the uppermost portion thereof lying in a single transverse plane which is perpendicular to the planes of the parallel lateral walls 14, 15. At least one of the lateral walls 14, 15 of the body section 11 is molded of transparent plastic material, such as acrylic resin. The body section 11 is formed in two parts with one part comprising the lateral walls 14, 15 and the wall section 21 providing a hollow compartment for supporting therein a pendulum indicator means or arm 40 and support means 12 and the other part comprising the upper wall or cover 25 which serves as a closure for the hollow compartment.

One of the depending semicircular portions 16, 17 of the lateral walls 14, 15 has on the surface thereof a protractor scale 30 spaced inwardly slightly from the outer edge thereof with the 0° mark at the end of a vertically disposed radial line of the protractor scale 30. The degree graduations increase by an increment of one from 0° to 90° on both sides of the 0° mark. If desired, degree graduations above 90° can also be provided.

The spaced lateral walls 14, 15 have at a point corresponding to the center of the protractor scale 30 oppositely disposed transverse passages 31, 32 (Figure 4) which are adapted to read therein end stud portions 33, 34, respectively, of a transverse support means or spindle 35 which rotatably supports a pendulum indicator arm 40. The spindle 35 is preferably formed as a single molded or machined part. The spacer member 37 which is formed inwardly of the end stud portion 33 has a larger diameter than the end stud portion 33 to provide an abutment shoulder when the end stud portion 33 is fitted in the passage 31. A circular bearing section 38 is formed midway between the ends of spindle 35 and is adapted to rotatably support freely thereon the pendulum indicator arm 40. The end stud portion 34 extends axially from the bearing section 38 and has a diameter less than the diameter of the bearing section 38. A washer 41 is adapted to be mounted on the stud portion 34 and serves as a spacer to prevent pressure being applied to the pendulum arm 40 by the lateral walls 14, 15. After the pendulum arm 40 and washer 41 are assembled on spindle 35, the assembly is inserted between the lateral walls 14, 15 by spreading the walls 14, 15 so that the ends of the stud portions 33, 34 can be inserted into the passages 31, 32, respectively. A small amount of adhesive is preferably applied to the outer ends of the stud portions 33, 34. The upper wall 25 is then cemented in position on the body section 11.

The pendulum arm 40 comprises a generally wedge-shaped member having spaced parallel front and rear faces 42, 42′, plane generally radially diverging side edges 43, 43′ providing a low center of gravity and a curved outer end edge 44 which has substantially the same curvature as the protractor scale. The inner end of the pendulum arm 40 has a transverse passage 45 extending therethrough of a diameter which permits the arm being freely rotatable on the bearing section 38 of the spindle 35. The center indicator line 46 is provided on the scale side surface 42 of the pendulum arm 40 which extends radially through the center of gravity thereof to the lower edge of the pendulum arm 40. The length of the pendulum arm 40 is such that the indicator line 46 extends to the lower edge of the degree graduation of the protractor scale 30.

The support means 12 for the protractor body section 11 comprises a rigid rod member 50 having an eyelet 51 formed at one end thereof and having the opposite end thereof externally threaded to receive an internally threaded end cap 52 which has an eyelet 53 formed therein. The rod member 50 is adapted to be inserted into transverse passages 54, 55 formed in the end walls 22, 23, respectively, of the protractor body section 11. The walls of the passages 54, 55 provide a bearing surface which rotatably engages the rod 50. The end walls 22, 23 are preferably thicker adjacent to the passages 54, 55, as at 57, to provide an enlarged bearing surface for the rod 50. Each of the eyelets 51, 53 is adapted to have a flexible line L or L' (FIG. 14) attached thereto after the rod has been secured to the body section 11 so that the protractor body section 11 can be suspended therebetween without applying tension to the body section 11.

While the protractor body section 11, as above described, can be used as a line angle degree level instrument by either suspending the body section between the lines L and L' attached to the eyelets 51, 53 or by placing the upper surfaces thereof in contact with the lower surface of an object, it is preferred to combine the protractor body section 11 with the supporting frame member 13 so as to broaden the use of the improved unitary line angle degree level instrument of FIG. 1 to include upwardly and laterally facing surfaces. The supporting frame section 13 is comprised of a generally planar lower base section 60 with arm sections 61, 62 extending perpendicular to the base section 60 and providing a recess therebetween for receiving the protractor body section 11. The reinforcing web sections 63, 64 are provided between the lower ends of the arm sections 61, 62 and the ends of base section 60. Transverse passages 65, 66 are formed in the arm sections 61, 62 slightly below the upper ends thereof to pivotally support therein the rod member 50 of the body section 11 so that the upper edges of the lateral walls 14, 15 and end walls 22, 23 extend above the upper ends of the arm sections 61, 62. The lower surface of the base section 60 lies in a plane parallel with the plane of the upper edges of end walls 22, 23 and lateral walls 14, 15. The arm sections 61, 62 of the frame member 13 are preferably somewhat thicker adjacent the transverse passages 65, 66 in order to provide stronger bearing surfaces 67, 67' for the rod 50 with portions 67' thereof serving as spacers between the ends of the protractor body section 11 and the inner surfaces of the arm sections 61, 62. The frame member 13 is preferably molded as a unitary structure from a plastic material, such as nylon or acrylic resin, or can be formed of metal, if desired.

In the modified form of the invention shown in FIG. 7, the upwardly extending arm sections 61a of the frame section 60a are provided adjacent to their upper ends with inwardly tapered slots 70 which extend inwardly from one edge thereof and connect with a transverse passage 72. The passages 72 are adapted to pivotally engage a support such as rod 50a or the stretch line L' itself. The slot 70 is proportioned so as to permit snap fitting the support rod into the passage 72 without having to remove an eyelet end cap 53 to remove the support rod 50a.

In the further modified form of the instrument shown in FIG. 8, the protractor body section 80 is modified to permit the supporting rod 50a being inserted into slots 81 extending inwardly from the upper edge of the end walls 16a so that the rod 50a can be made with both eyelets for attachment of a supporting flexible line permanently affixed. The rod 50a can be retained within the slots 81 formed in the end walls 23a, 22a by the upper wall or cover section 25a which preferably has a depending bearing surface 82 formed on the lower side adjacent each end thereof or the rod 50a can be fixedly secured by a suitable adhesive to the end walls 28a. The foregoing embodiment can be used in conjunction with the modified frame section 60a shown in FIG. 7, wherein a support rod, such as rod 50a, can be pivotally mounted in the frame section 61a by snap fitting the rod into the transverse passages 72 through the tapered slots 70 without removing the eyelet formed on the support rod 50a of the protractor body section 11.

Some of the uses of the instrument of FIG. 1 and the disclosed modifications thereof are shown in FIGS. 9—14 of the drawing. Thus, in Figure 9, the outer surface of the base section 60 is placed in contact with the lower surface of a beam or the like and the protractor body section 11 is pivotally moved 180° about the support rod 50 so that the semicircular section with the protractor scale 30 thereon hangs downwardly in a substantially vertical position and the pendulum arm 40 rotates on the spindle 35 under the pull of gravity and quickly comes to rest with the indicator line vertically disposed indicating whether the surface is horizontal or the degree to which the surface is other than horizontal.

FIG. 10 illustrates the use of the instrument of FIG. 1 wherein the base section 60 is placed in contact with a surface wherein the body section 11 pivotally moves relative to the support rod 50 until the protractor body section 11 assumes a vertical position. With the protractor body section 11 disposed vertically there is no increase in the friction between the bearing surface 38 and the pendulum arm 40 which would tend to prevent the pendulum rotating until the indicator line 46 is strictly vertical, because of the pendulum body section being in a position other than substantially vertical.

FIG. 11 illustrates the use of the instrument of FIG. 1 wherein the outer surface of the base section 60 is placed against an intersection formed by substantially vertical and horizontal surfaces and wherein the protractor body section 11 moves pivotally about 90° relative to the support rod 50 and with the indicator line 46 of the pendulum arm 40 assuming a vertical position to indicate whether the line of intersection of the two surfaces is horizontal.

In FIG. 12 the outer surface of the base section 60 of the instrument of FIG. 1 is placed against a surface to determine whether the surface is vertical and the indicator line 46 of pendulum arm 40 comes to rest in a vertical position indicating whether the surface is perpendicular.

FIG. 13 illustrates a further method of using the instrument of FIG. 1 wherein the upper wall 25 of the protractor body section 11 is placed in contact with the lower surface of an article and the indicator line 46 of arm 40 quickly shows whether the surface is horizontal.

FIG. 14 illustrates use of the protractor body section 11 with its support rod 12 for determining whether a line is horizontal without the use of the frame section 13. The latter arrangement may be preferred where the flexible lines L, L' used for suspending the instrument are relatively light and an instrument having minimum weight must be used.

I claim:
1. A line angle degree level instrument comprising:
    a protractor body section formed with horizontally spaced vertically disposed parallel walls with the upper edges thereof lying in a single transverse plane, said vertical walls being connected along the upper extremities of their vertical edges by spaced transverse wall sections, at least one of said vertical walls being transparent and provided with a protractor scale having degree graduations with the centerline of said scale being perpendicular to said transverse plane;
    a pendulum indicator arm pivotally mounted for free movement between said vertical walls on an axis which is parallel with said transverse plane at a point corresponding to the center of said protractor scale;
    a centrally disposed indicator line on said indicator arm a portion of which is disposed opposite said protractor scale;
    support means engaging said protractor body section extending longitudinally parallel to said transverse plane and spaced above said pendulum indicator arm to freely support said body section, said support means being in transverse supporting engagement adjacent its ends with said body section and having clearance longitudinally for longitudinal expansion under tension of said support means relative to said body section, and means connecting the spaced lateral walls adjacent said upper edges to form a protective enclosure for the pivotally mounted pendulum indicator arm.

2. A line angle degree level instrument as in claim 1, wherein said support means is a tension-transmitting means and has fastening means at the opposite ends thereof for attaching thereto a flexible support line.

3. A line angle degree level instrument as in claim 1, wherein said support means and said body section are pivotally as well as axially movable relative to each other.

4. A line angle degree level instrument as in claim 1, wherein said support means is an elongated element extending through said transverse wall sections in journaled relationship.

5. A line angle degree level instrument as in claim 1, wherein said body section has slots formed in it extending inwardly at said transverse wall sections and a connecting slot in the adjacent one of said vertical walls and said support means is received laterally in said slots.

6. A line angle degree level instrument comprising:
a protractor body section formed with horizontally spaced substantially parallel vertical walls with the upper edges thereof lying in a single transverse plane, said vertical walls being connected along their lower edges and lateral edges by a transverse wall section;
at least one of said vertical walls being transparent and provided with a protractor scale having degree graduations with the centerline of said scale being perpendicular to said transverse plane;
a pendulum arm pivotally mounted between said vertical walls on an axis which is perpendicular to said vertical walls and parallel with said transverse plane at a point corresponding to the center of said protractor scale, a centrally disposed indicator line on said pendulum arm a portion of which is disposed opposite said protractor scale;
said protractor body section having an elongated support means extending longitudinally therethrough for pivotal support of said body and spaced above said pendulum arm with the ends thereof extending beyond opposite end portions of said body section;
an upper wall section connecting the spaced vertical walls adjacent said upper edges to form a protective enclosure for said pendulum arm, and
a frame means having a planar base section disposed parallel with the said transverse plane of the upper edges of the body section and including at the opposite ends of the base section upwardly extending arm sections which are adapted to pivotally support said protractor body section therebetween for relative pivotal movement about said support means;
said body section being freely mounted on the support means with clearance for relative longitudinal expansion of said support means so that tension applied longitudinally to the support means is not applied to the body section.

7. A line angle degree level instrument as in claim 6, wherein said upper edges of said body section extend above said arm sections to permit said upper edges being placed in direct contact with a surface without interference from said arm sections when making a measurement with said instrument.

8. A line angle degree level instrument as in claim 6, wherein said support means is detachably mounted in a transverse passage through each of said arm sections of said frame member with an access slot extending between each said transverse passage and surface portions of the respective arm sections.

9. A line angle degree level instrument as in claim 6, wherein said support means has eyelet means at the opposite end thereof for attaching thereto a flexible support line.

10. A line angle degree level instrument comprising:
a protractor body section of plastic formed with spaced vertical walls with the upper edges thereof lying in a single transverse plane, said walls being connected along their lower edges and lateral edges by a transverse wall section, at least one of said walls being transparent and provided with a protractor scale having degree graduations with the centerline of said scale being perpendicular to said transverse plane;
a vertically hanging pendulum arm pivotally mounted at its upper end between said lateral walls on an axis which is parallel with said transverse plane at a point corresponding to the center of said protractor scale and bodily widened at its lower end to provide a low center of gravity;
a centrally disposed indicator line on said arm a portion of which is disposed horizontally between said protractor scale and said center of gravity, said protractor body section having a rigid support means extending longitudinally therethrough spaced above said pendulum arm and with the ends thereof extending with clearance for relative longitudinal expansion of said support means beyond the opposite ends of said body section to pivotally support the said body section in a depending position without longitudinal tension upon the support means being transmitted to said body section;
said rigid support means having at the outer ends thereof means for attaching thereto a flexible support line adapted to vertically support said protractor body section; and
an upper wall section connecting the spaced walls adjacent said upper edges to form a protective enclosure for the pivotally mounted pendulum arm.